US009665280B2

(12) United States Patent
Bair et al.

(10) Patent No.: US 9,665,280 B2
(45) Date of Patent: *May 30, 2017

(54) CACHE COHERENCY VERIFICATION USING ORDERED LISTS

(71) Applicant: International Business Machines Corporation, Armonk, NY (US)

(72) Inventors: Dean G. Bair, Bloomington, NY (US); Jonathan T. Hsieh, Poughkeepsie, NY (US); Matthew G. Pardini, Natick, MA (US); Eugene S. Rotter, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

This patent is subject to a terminal disclaimer.

(21) Appl. No.: 14/502,153

(22) Filed: Sep. 30, 2014

(65) Prior Publication Data

US 2016/0092368 A1    Mar. 31, 2016

(51) Int. Cl.
*G06F 12/08* (2016.01)
*G06F 3/06* (2006.01)
(Continued)

(52) U.S. Cl.
CPC .......... *G06F 3/0604* (2013.01); *G06F 3/0644* (2013.01); *G06F 3/0673* (2013.01);
(Continued)

(58) Field of Classification Search
CPC .... G06F 3/0604; G06F 3/0644; G06F 3/0673; G06F 12/0837; G06F 12/0893;
(Continued)

(56) References Cited

U.S. PATENT DOCUMENTS

| 5,428,761 A | * | 6/1995 | Herlihy ............... G06F 12/0831 711/130 |
| 5,548,795 A | * | 8/1996 | Au ........................ G06F 3/0601 710/3 |

(Continued)

OTHER PUBLICATIONS

Dean G. Bair, et al.,"Cache Coherency Verification Using Ordered Lists," U.S. Appl. No. 14/841,783, filed Sep. 1, 2015.

(Continued)

*Primary Examiner* — David X Yi
*Assistant Examiner* — Ramon A Mercado
(74) *Attorney, Agent, or Firm* — Cantor Colburn LLP; Margaret A. McNamara (57) ABSTRACT

Embodiments relate to cache coherency verification using ordered lists. An aspect includes maintaining a plurality of ordered lists, each ordered list corresponding to a respective thread that is executed by a processor, wherein each ordered list comprises a plurality of atoms, each atom corresponding to a respective operation performed in a cache by the respective thread that corresponds to the ordered list in which the atom is located, wherein the plurality of atoms in an ordered list are ordered based on program order. Another aspect includes determining a state of an atom in an ordered list of the plurality of ordered lists. Another aspect includes comparing the state of the atom in an ordered list to a state of an operation corresponding to the atom in the cache. Yet another aspect includes, based on the comparing, determining that there is a coherency violation in the cache.

14 Claims, 9 Drawing Sheets

(51) Int. Cl.
*G06F 12/0893* (2016.01)
*G06F 12/0837* (2016.01)

(52) U.S. Cl.
CPC ...... *G06F 12/0837* (2013.01); *G06F 12/0893* (2013.01); *G06F 2212/1016* (2013.01); *G06F 2212/281* (2013.01); *G06F 2212/465* (2013.01)

(58) Field of Classification Search
CPC ....... G06F 2212/1016; G06F 2212/281; G06F 2212/465
See application file for complete search history.

(56) References Cited

U.S. PATENT DOCUMENTS

| | | | | |
|---|---|---|---|---|
| 5,671,406 A | * | 9/1997 | Lubbers | G06F 17/30958 707/696 |
| 5,923,862 A | * | 7/1999 | Nguyen | G06F 9/28 712/208 |
| 6,205,465 B1 | * | 3/2001 | Schoening | G06F 8/456 709/223 |
| 6,205,494 B1 | * | 3/2001 | Williams | G06F 13/38 710/20 |
| 6,253,291 B1 | * | 6/2001 | Pong | G06F 12/0811 711/146 |
| 6,334,182 B2 | * | 12/2001 | Merchant | 712/205 |
| 7,047,374 B2 | * | 5/2006 | Sah | G06F 12/0813 710/39 |
| 7,739,456 B1 | * | 6/2010 | Cypher | G06F 9/3004 711/145 |
| 8,977,810 B2 | * | 3/2015 | Chiu | G06F 13/1626 711/101 |
| 9,367,464 B2 | * | 6/2016 | Novakovsky | G06F 12/0842 |
| 2003/0005263 A1 | * | 1/2003 | Eickemeyer | G06F 9/3802 712/218 |
| 2005/0055490 A1 | * | 3/2005 | Widell | G06F 9/467 711/1 |
| 2006/0026158 A1 | * | 2/2006 | Hsu | G06F 7/22 |
| 2008/0104335 A1 | * | 5/2008 | Cypher | G06F 9/3004 711/141 |
| 2009/0019231 A1 | * | 1/2009 | Cypher | G06F 12/08 711/141 |
| 2010/0125707 A1 | * | 5/2010 | Cypher | G06F 9/3004 711/145 |
| 2010/0153655 A1 | * | 6/2010 | Cypher | G06F 9/3851 711/139 |
| 2010/0235365 A1 | * | 9/2010 | Newby, Jr. | G06F 7/24 707/752 |
| 2010/0269102 A1 | * | 10/2010 | Latorre | G06F 9/3842 717/130 |
| 2011/0016470 A1 | * | 1/2011 | Cain, III | G06F 9/528 718/101 |
| 2013/0326153 A1 | * | 12/2013 | Rozas | G06F 9/38 711/141 |

OTHER PUBLICATIONS

List of IBM Patents or Patent Applications Treated as Related; Sep. 30, 2014, pp. 1-2.

* cited by examiner

```
┌─────────────────────────────────────────────────────────────────┐
│ DURING EXECUTION OF APPLICATION(S), THREADS CORRESPONDING TO    │
│    APPLICATION(S) PERFORM OPERATIONS WITH RESPECT TO CACHE      │
│                              401                                │
└─────────────────────────────────────────────────────────────────┘
                                │
                                ▼
┌─────────────────────────────────────────────────────────────────┐
│    FOR EACH THREAD, MAINTAIN AN ORDERED LIST OF ATOMS (SEE FIG. 5) │
│                              402                                │
└─────────────────────────────────────────────────────────────────┘
                                │
                                ▼
┌─────────────────────────────────────────────────────────────────┐
│         VERIFY COHERENCY OF CACHE BASED ON ORDERED LIST(S)      │
│                              403                                │
└─────────────────────────────────────────────────────────────────┘
```

```
┌─────────────────────────────────────────────────────────────────┐
│   ATOMS ASSOCIATED WITH A TRANSACTION ARE ADDED TO ORDERED LIST │
│                              901                                │
└─────────────────────────────────────────────────────────────────┘
                                │
                                ▼
┌─────────────────────────────────────────────────────────────────┐
│     BASED ON COMMITTING TRANSACTION, REMOVE ANY ATOMS ASSOCIATED│
│          WITH TRANSACTION FROM ORDERED LIST AND ADD ATOMS       │
│             ASSOCIATED WITH TRANSACTION TO REFERENCE MODEL      │
│                              902                                │
└─────────────────────────────────────────────────────────────────┘
                                │
                                ▼
┌─────────────────────────────────────────────────────────────────┐
│       BASED ON ABORTING TRANSACTION, DELETE ATOMS ASSOCIATED    │
│              WITH TRANSACTION FROM ORDERED LIST                 │
│                              903                                │
└─────────────────────────────────────────────────────────────────┘
```

FIG. 9

CACHE COHERENCY VERIFICATION USING ORDERED LISTS

BACKGROUND

The present invention relates generally to verification of cache coherency in a computer system, and more specifically, to cache coherency verification using ordered lists.

Operations in a cache of a computer system may be modeled, and the model compared to the actual state of the cache, in order to determine coherency of the cache. Cache coherency in out-of-order, virtual multi-threaded, multi-core, or multiprocessor computer systems can be relatively complex to model, as the coherency specifications for such devices may have strict rules regarding how each component in the device observes and updates data, but may not dictate how those operations are actually achieved. The goal of the coherency model is to enforce the coherency rules. Microarchitectures may make use of the flexibility of the coherency rules, and even appear to violate the coherency rules in the short term, in order to increase performance. The coherency modeling system will dictate the granularity of the coherency modeling, the design variance and amount of change that can be tolerated, the types of errors that can be caught by the coherency modeling system, and overall ease of debugging.

Some coherency modeling systems utilize one or more timestamps for each cache line access, and a system to update and compare those timestamps to prevent violation of the coherency rules. Use of timestamps requires a very thorough understanding of the access times of the microarchitecture, and may not be very resilient to any changes that affect that timing. Other coherency modeling systems comprise finite state machines, in which coherency events transition the model from one legal state to another, either as a state by state simulation, or as a formal state space exploration of the implemented logic. These approaches are often high-level and may require generalizations for each state, and may preclude some lower level checking of the implementation that may be beneficial during the design phase. Further coherency modeling systems create a graph of all cache accesses and ensure that the vertices followed from the beginning of execution to the end are all legal.

SUMMARY

Embodiments include a method, system, and computer program product for cache coherency verification using ordered lists. An aspect includes maintaining a plurality of ordered lists, each ordered list corresponding to a respective thread that is executed by a processor, wherein each ordered list comprises a plurality of atoms, each atom corresponding to a respective operation performed in a cache by the respective thread that corresponds to the ordered list in which the atom is located, wherein the plurality of atoms in an ordered list are ordered based on program order. Another aspect includes determining a state of an atom in an ordered list of the plurality of ordered lists. Another aspect includes comparing the state of the atom in an ordered list to a state of an operation corresponding to the atom in the cache. Yet another aspect includes, based on the comparing, determining that there is a coherency violation in the cache.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of cache coherency verification using ordered lists are provided, with exemplary embodiments being discussed below in detail. A system for modeling cache coherency uses a set of ordered lists, which may also be referred to as coherency stacks. Each ordered list corresponds to a respective thread in the system. Each ordered list holds atoms corresponding to individual lower-level operations in the cache that are performed by the thread corresponding to the ordered list. Each ordered list may be ordered based on the program order of operations, as given by the application that performed each operation, and operation dependencies between atoms. The cache is modeled using insertions and deletions of atoms in the ordered lists, and atoms are evaluated to determine any coherency violations in the cache. Embodiments of cache coherency verification using ordered lists may also include a reference model, which gives a state of the cache including operations that cannot be rolled back.

Each ordered execution path, or thread, has a respective ordered list, yielding a model that maintains as many ordered lists as there are threads, cores, and/or processors in the system. Each ordered list has a bottom and top, and the atoms within the list are ordered from oldest to youngest operational age. The atoms correspond to the smallest atomic operations that can occur in the cache per the architecture of the machine. Each atom may include data regarding the relative program order, operational state, and content of the operation corresponding to the atom. Examples of cache operations that may correspond to individual atoms include a load operation, a store operation, an invalidate, and a snoop. Some atoms, such as atoms corresponding to a snoop or an invalidate, may not have a program order in some embodiments. By maintaining an ordered list through insertions, deletions, and evaluation of atoms in the ordered list, the coherency rules are maintained implicitly by the order of the list. New atoms are inserted at the top of an ordered list and moved into the correct location in the ordered list by comparison to other atoms that are already in the ordered list. The movements of atoms in an ordered list may vary based upon the specific architecture that is being modeled; various embodiments may implement top insertion, evaluation, and deletion of atoms. For embodiments that include a reference model, removal of atoms from the ordered lists to the reference model may also be performed. For embodiments that model a simultaneous multithreaded (SMT) architecture having more than one ordered list, bottom insertion of atoms across ordered lists may also be performed for cross-thread coherency operations such as stores.

Each ordered list may comprise an ordered list, list, deque or any appropriate similar structure which may contain zero or more entries. Each ordered list corresponds to a respective thread, virtual thread, or core in the design being modeled. The atoms may comprise any appropriate objects that represent atomic cache operations, where the granularity of each object is dictated by the design architecture, or if objects of a smaller granularity are employed an additional mechanism is used to bind those objects into atomic cache operations. The reference model comprises a base or flat version of the cache being modeled, and may comprise, for example, a hash, dictionary, list, array, or any appropriate similar structure. The reference model may be omitted in some embodiments, as all information that would comprise the reference model can be obtained from the ordered lists. An intermediary synchronization stack may be used in conjunction with the reference model for systems that allow atoms to occur on one thread visible to another thread. The synchronization stack may comprise any appropriate structure, such as an ordered list, list, deque, or other appropriate structure. While the synchronization stack is most often used for stores, the synchronization stack may be used for any type of coherency operation in various embodiments.

Atoms that are directly related to an ordered list may be inserted at the top of an ordered list, move downwards during execution of the thread, and evaluated toward the bottom of the ordered list. Atoms that are indirectly related to the ordered list may be inserted at the bottom of the ordered list and evaluated toward the top. The coherency of any atom in the ordered lists can be verified by combining data from the reference model, synchronization stack, and the atoms below the atom being evaluated in the ordered list. Atoms corresponding to transactions may also be tracked using the ordered lists, and the atoms corresponding to a transaction may be retired or deleted as a group from the ordered list based on committing or aborting of the transaction.

Figure 1:
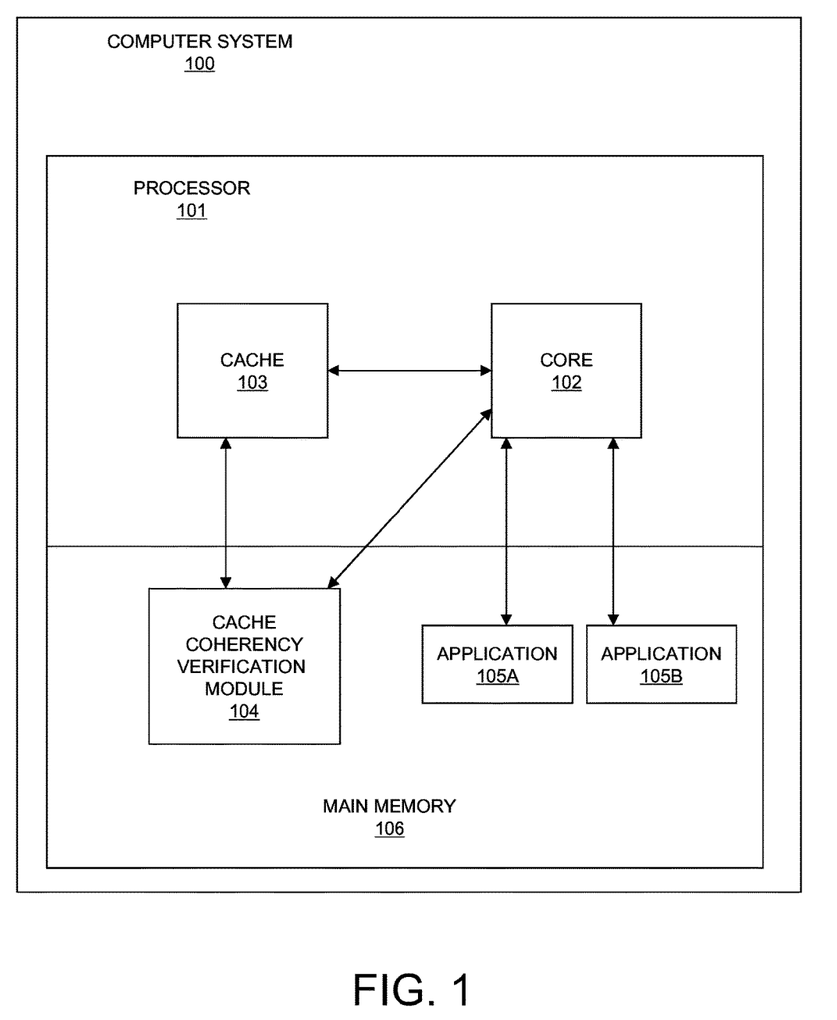
FIG. 1 depicts a computer system for cache coherency verification using ordered lists in accordance with an embodiment.

FIG. 1 illustrates an embodiment of a computer system 100 for cache coherency verification using ordered lists. Computer system 100 includes a processor 101 and a main memory 106. The core 102 in processor 101 executes applications, such as applications 105A and 105B, by running one or more threads. These threads perform operations, such as load and store operations, on data in the cache 103. The operations proceed through pipeline stages during execution, which include a finish stage and subsequent completion stage. Each operation may have a respective program order based on its location in the application that performs the operation. Core 102 is in communication with a cache coherency verification module 104, which determines whether or not there are any coherency violations in cache 103 during execution of operations by core 102 by maintaining ordered lists of operations corresponding to each thread that is run by the core 102. Cache coherency verification module 104 is also in communication with cache 103, in order to perform comparison of the state of the cache 103 with the model of the cache that is held in cache coherency verification module 104. Cache coherency verification module 104 is discussed in further detail below with respect to FIG. 2. FIG. 1 is shown for illustrative purposes only; a computer system such as computer system 100 may execute any appropriate number of applications, and have any appropriate number of cores and number and levels of cache.

Figure 2:
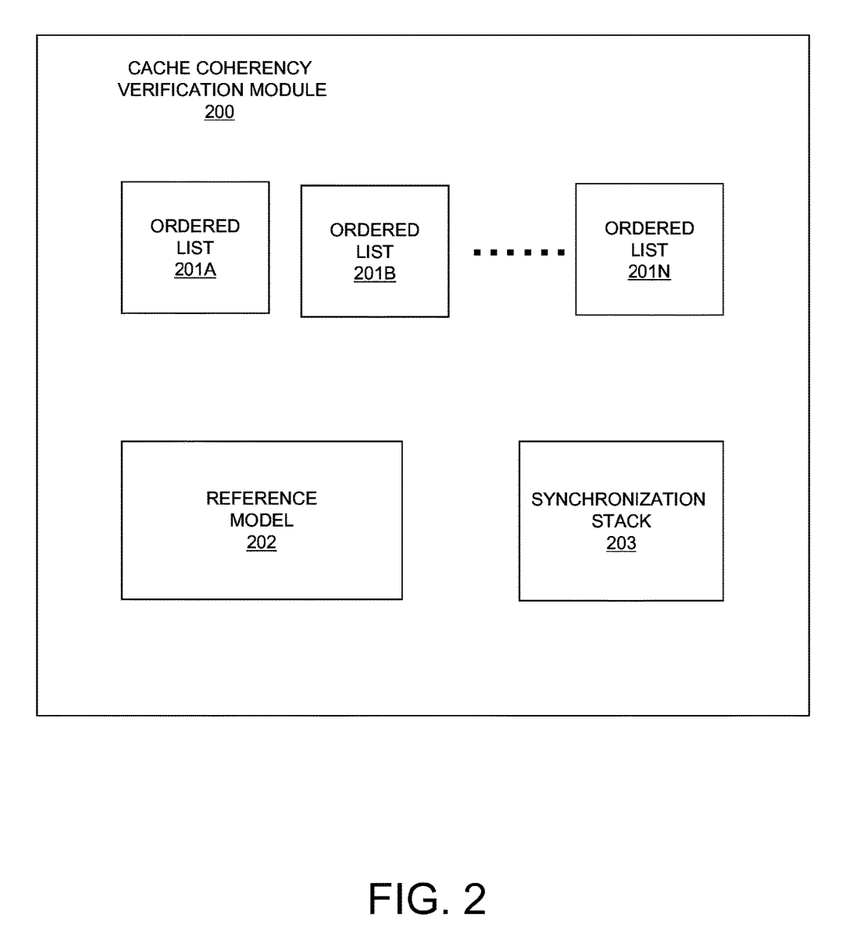
FIG. 2 depicts a cache coherency verification module in accordance with an embodiment.

FIG. 2 illustrates an embodiment of a cache coherency verification module 200, which corresponds to cache coherency verification module 104 of FIG. 1. Cache coherency verification module 200 includes a plurality of ordered lists 201A-N. Each ordered list of ordered lists 201A-N corresponds to a respective thread that is being executed in processor 101. The ordered lists 201A-N are discussed in further detail below with respect to FIG. 3. The cache coherency verification module 200 receives data from the core 102 regarding operations that are in the pipeline that affect the cache 103, and which thread is performing each operation.

Embodiments of a cache coherency verification module 200 may further include a reference model 202. At a certain point in execution, the processor has completed executing some of the operations, and these operations can no longer be unwound. Such operations may be referred to as retired. Since no newly inserted atoms can effect a retired operation, the atom corresponding to the retired operation may be removed from the ordered list. The result of the retired atom is placed into the reference model 202, or, in some embodiments, into the synchronization stack 203. The reference model 202 gives a state of the cache that reflects these retired operations. For a cache that is used in conjunction with a plurality of threads, a single reference model 202 is used in conjunction with the plurality of ordered lists 201A-N corresponding to the threads.

In some embodiments, a synchronization stack 203 may also be used in conjunction with the reference model 202. For systems with more than one ordered list, cross-list operations (which may be handled via bottom insertion) may not align at the bottom of each ordered list 201A-N. If the reference model 202 is shared between multiple ordered lists 201A-N, the synchronization stack 203 is required between the ordered lists 201A-N and the reference model 202 to realign those shared atoms. In some embodiments the synchronization stack 203 may contain only stores; in further embodiments, a synchronization stack may contain other types of atoms. As atoms retire and the result of their respective operations can no longer be unwound, the synchronization stack 203 tracks the ordered lists 201A-N from which the retired atoms have been removed. When an atom representing the single operation has been removed from each of the ordered lists 201A-N covered by the reference model 202, the operation can be committed to the reference model 202. In this way, if a cross-thread store is considered younger than some operations in an ordered list, the reference model 202 is not polluted by the other threads retiring the cross-thread store.

Figure 3:
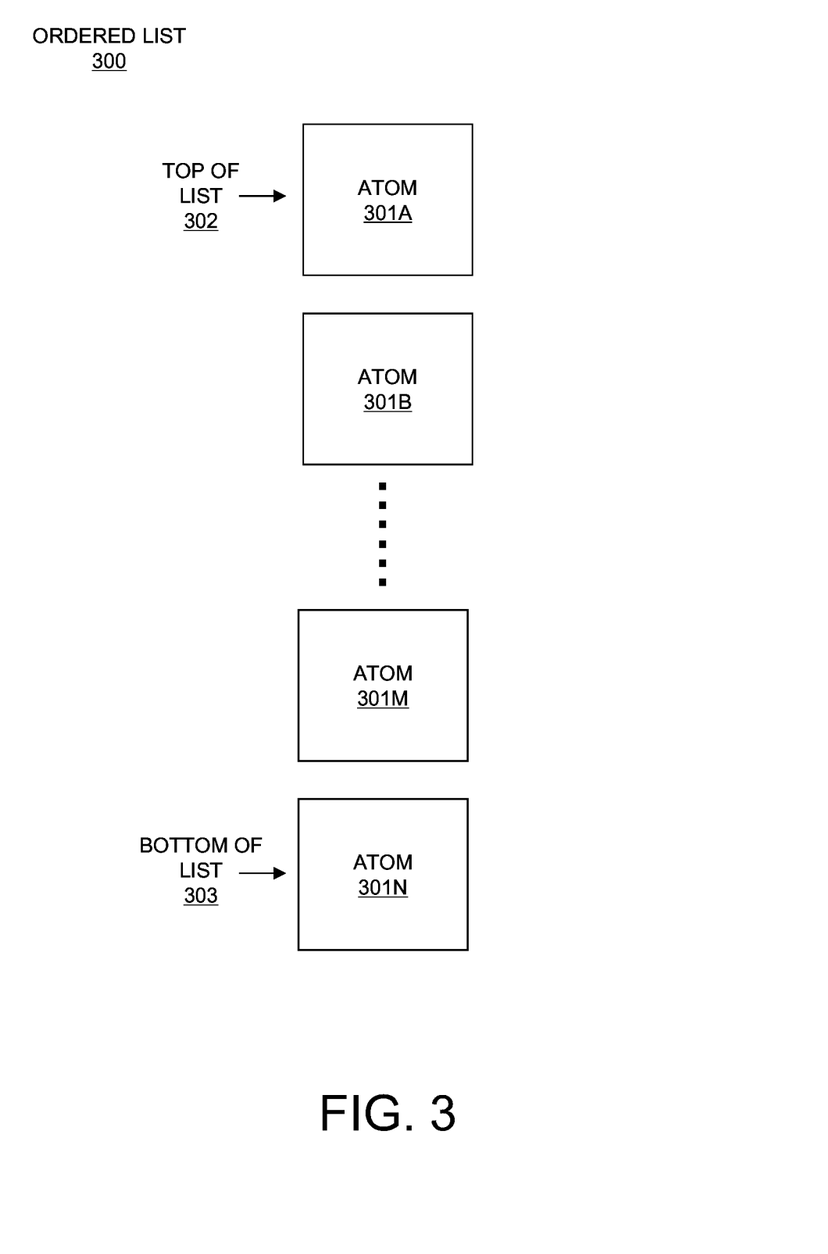
FIG. 3 depicts an ordered list in accordance with an embodiment.

FIG. 3 illustrates an embodiment of an ordered list 300, which may correspond to any of ordered lists 201A-N that were shown in FIG. 2. The ordered list 300 holds atoms 301A-N that correspond to operations that are performed by the thread that corresponds to the ordered list 300. The atoms 301A-N are ordered based on dependencies and program order from the top of the stack 302 (youngest) to the bottom of the stack 303 (oldest). Each atom of atoms 301A-N corresponds to a single, atomic operation type that is performed by the core 102 during execution of the thread corresponding to ordered list 300, such as a load, store, invalidate, or snoop. Each atom of atoms 301A-N an indicator of the type of the individual operation corresponding to the atom, and further information corresponding to its respective operation. An atom corresponding to a load may hold the address of the load and the program order of the load. An atom corresponding to a store may hold the address of the store, the data that is being stored by the store, and the program order of the store. An atom corresponding to an invalidate may hold the address of the invalidate and the program order of the invalidate. An atom corresponding to a snoop may hold an address of the snoop and a program order of the snoop; however, in some embodiments, snoops are performed asynchronously and program order may be omitted from snoop atoms. FIG. 3 is shown for illustrative purposes only, an ordered list may hold any appropriate number of atoms, and the atoms may each correspond to any appropriate type of operation.

Figure 4:
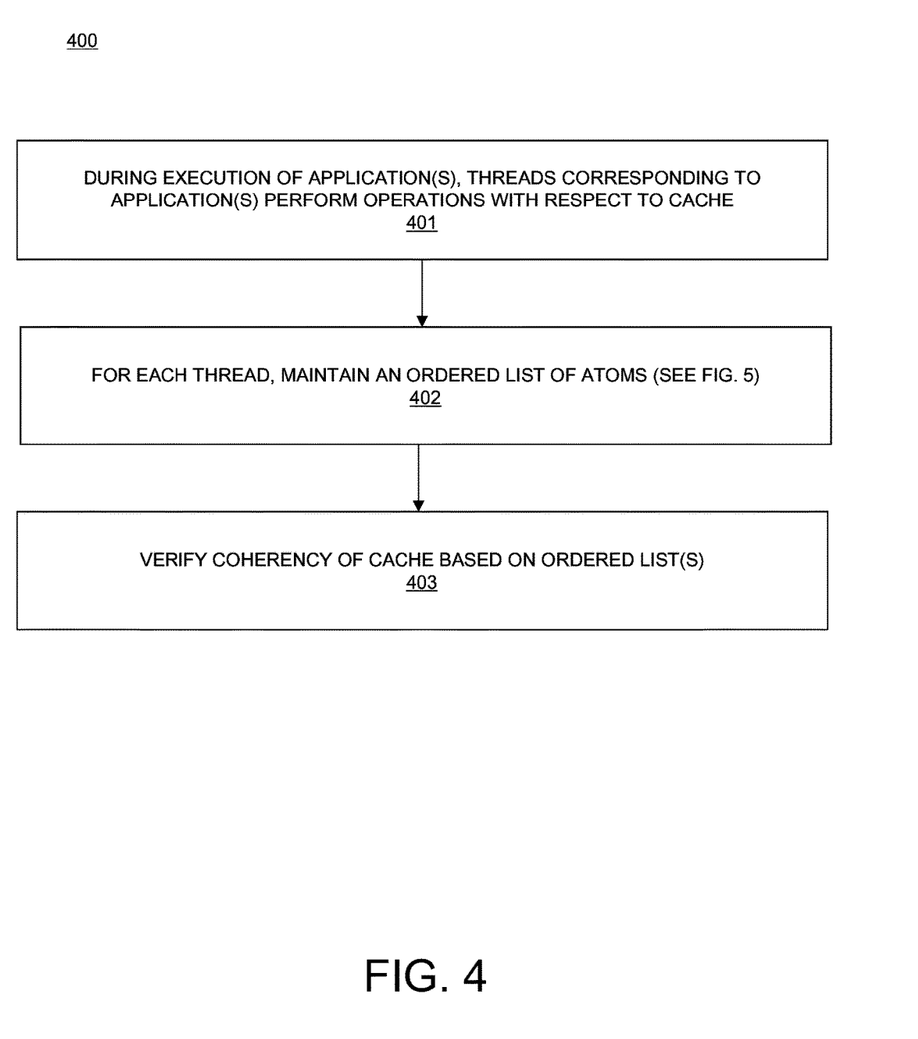
FIG. 4 depicts a process flow for cache coherency verification using ordered lists in accordance with an embodiment.

FIG. 4 illustrates an embodiment of a method 400 of cache coherency verification using ordered lists. FIG. 4 is discussed with respect to FIGS. 1-3. First, in block 401, during execution of one or more applications, such as applications 105A and 105B in a processor 101, one or more threads perform operations with respect to the cache 103, such as loads, stores, snoops, and invalidates. In block 402, for each of the one or more threads, an ordered list, such as ordered lists 201A-N/300 is maintained by cache coherency verification module 104. Each ordered list comprises a plurality of atoms 301A-N that are ordered in the ordered list 300 based on program order and any dependencies. Block 402 is discussed in further detail below with respect to FIG. 5. Blocks 401 and 402 are performed in parallel, such that, in block 403, it is determined based on the ordered lists 201A-N whether any coherency violations occur in the cache 103. Coherency violations may be determined based on evaluation of atoms in the ordered lists 201A-N/300, which are discussed below with respect to block 502 of FIG. 5. An evaluation of an atom gives a state of an atom, and the state of the atom may be compared to the state of the operation corresponding to the atom in the computer hardware, e.g., core 102 and cache 103. Coherency violations that may be determined based on comparison of the state of the atom to the state of the corresponding operation may include a lack of visible dependencies or incorrect data.

Figure 5:
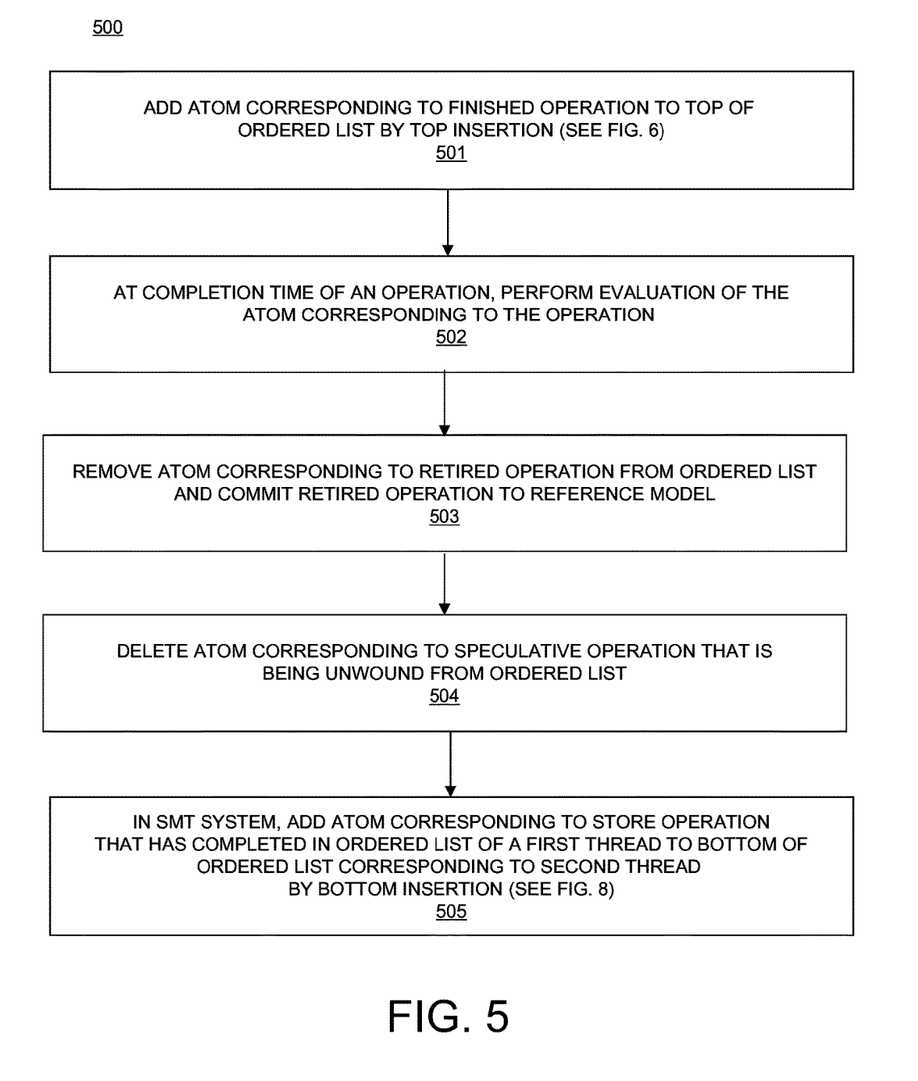
FIG. 5 depicts a process flow for maintaining an ordered list in accordance with an embodiment.

FIG. 5 illustrates an embodiment of a method 500 for maintaining an ordered list, such as an ordered list 300 of FIG. 3, as is performed in block 402 of FIG. 4. The various blocks of method 500 are triggered based on operations that are performed by the thread that corresponds to the ordered list 300. In block 501, for an operation that is finished by the thread corresponding to the ordered list 300, an atom, such as atom 301A, corresponding to the operation is added to the top 302 of the ordered list 300 via top insertion. The atom corresponds to a single operation, and has an operation type. The possible operation types may include load, store, and snoop in various embodiments. The atom may further include program order, address, and data information. A new atom is placed at the top 302 of the ordered list, and the program order of the new atom is compared to the program order of the atom directly below the new atom. If the program order of the new atom indicates that the new atom is younger than the atom directly below the new atom, the new atom is the new top 302 of the ordered list, and the top insertion of the new atom is complete. If the program order of the new atom indicates that the new atom is older than the atom directly below the new atom, then the type of operation associated with the new atom and the atom directly below the new atom are compared. If the new atom is not dependent on the lower atom, then the new atom is moved below the lower atom, and the lower atom returns to being the top of the ordered list. The new atom is them compared to the next atom down in the list, and the new atom moves down the stack until the new atom is determined to be younger than or dependent on the atom directly below it, or until the new atom is the bottom of the stack. Top insertion, such as is performed in block 501 of FIG. 5, is discussed in further detail with respect to FIG. 6. Block 501 of FIG. 5 is performed for each operation that is performed in the cache 103 by the thread corresponding to the ordered list 300.

In block 502, an atom in ordered list 300 is evaluated in order to determine whether there have been any coherency violations. Block 502 is performed as part of block 403 of FIG. 4. Evaluation may be performed at completion time of an operation by the thread corresponding to the ordered list 300; the atom corresponding to the completed operation is evaluated to determine if there are any coherency violations regarding the completed operation. In various embodiments, evaluation of atoms may be performed for each atom at any appropriate specific point during program execution. In an evaluation such as performed in block 502, the atom being evaluated is compared to every atom below the atom being evaluated in the ordered list 300. A state of the atom being evaluated, which may include the value of the data associated with the atom being evaluated, is determined based on comparison with the atoms below the atom in the ordered list 300. Each atom in the ordered list that is located below the atom being evaluated contributes to the state of the atom being evaluated. Coherency violations that may be determined based on the state of the atom may include a lack of visible dependencies, or incorrect data. Evaluation, such as is performed in block 502 of FIG. 5, is performed at the specified point (e.g., completion) for each atom in the ordered list 300. In further embodiments, evaluation such as is performed in block 502 may be triggered based on an error occurring during execution of an application.

In block 503, in embodiments that include a reference model such as reference model 202, an atom corresponding to a completed operation that cannot be unwound may be removed from the ordered list 300 and committed to the reference model 202, as discussed above with respect to FIG. 2. At a certain point in execution, the processor has completed executing an operation, and the operation can no longer be unwound. Such operations may be referred to as retired. Since no newly inserted atoms can effect a retired operation, the atom corresponding to the retired operation may be removed from the ordered list. The result of the retired atom placed into the reference model 202. The reference model 202 gives a state of the cache that reflects these retired operations. For a cache that is used in conjunction with a plurality of threads, a single reference model 202 is used in conjunction with the plurality of ordered lists 201A-N corresponding to the threads. In embodiments that include a reference model, block 503 is performed for any operation that is retired by the thread corresponding to the ordered list 300. In further embodiments, a retired operation may be stored in the synchronization stack 203 before being committed to the reference model 202. For example, if a first thread performs a store, and then the atom corresponding to the store is retired from the ordered list of the first thread, the store may be placed in the synchronization stack 203 until all other threads have observed the store.

In block 504, an atom that corresponds to an operation that was executed speculatively and is being unwound, or flushed, before completion by the thread corresponding to the ordered list 300 is deleted from the ordered list 300. For example, atoms corresponding to operations performed in a branch down a wrong path may have been added to the ordered list in block 501, and as a result of unwinding at branch evaluation time, must be removed in block 504. Deletion may performed by traversing the ordered list 300 and removing any identified atoms corresponding to the path that is being unwound. Block 504 may be performed whenever any operation is unwound by the thread corresponding to ordered list 300.

In block 505, in embodiments that comprise an SMT system, an atom corresponding to a store that has completed in a first thread, but that affects one or more other threads, is added to the bottom 303 of the one or more ordered lists of the one or more other threads via bottom insertion. Since the atom corresponding to the store originated from a first thread, it is not possible to evaluate the atom based on program order information in the ordered list corresponding to a second thread. Instead the atom is inserted at the bottom 303 of the ordered list of the second thread, and is evaluated against the content of each successive atom above the bottom-inserted atom, and moved up until a dependency is found (and insertion completes), or until the atom is at the top of the ordered list. Bottom insertion is discussed in further detail below with respect to FIG. 8. Block 505 is performed in embodiments that comprise an SMT system whenever a cross-thread store completes in any ordered list of the ordered lists 201A-N.

Figure 6:
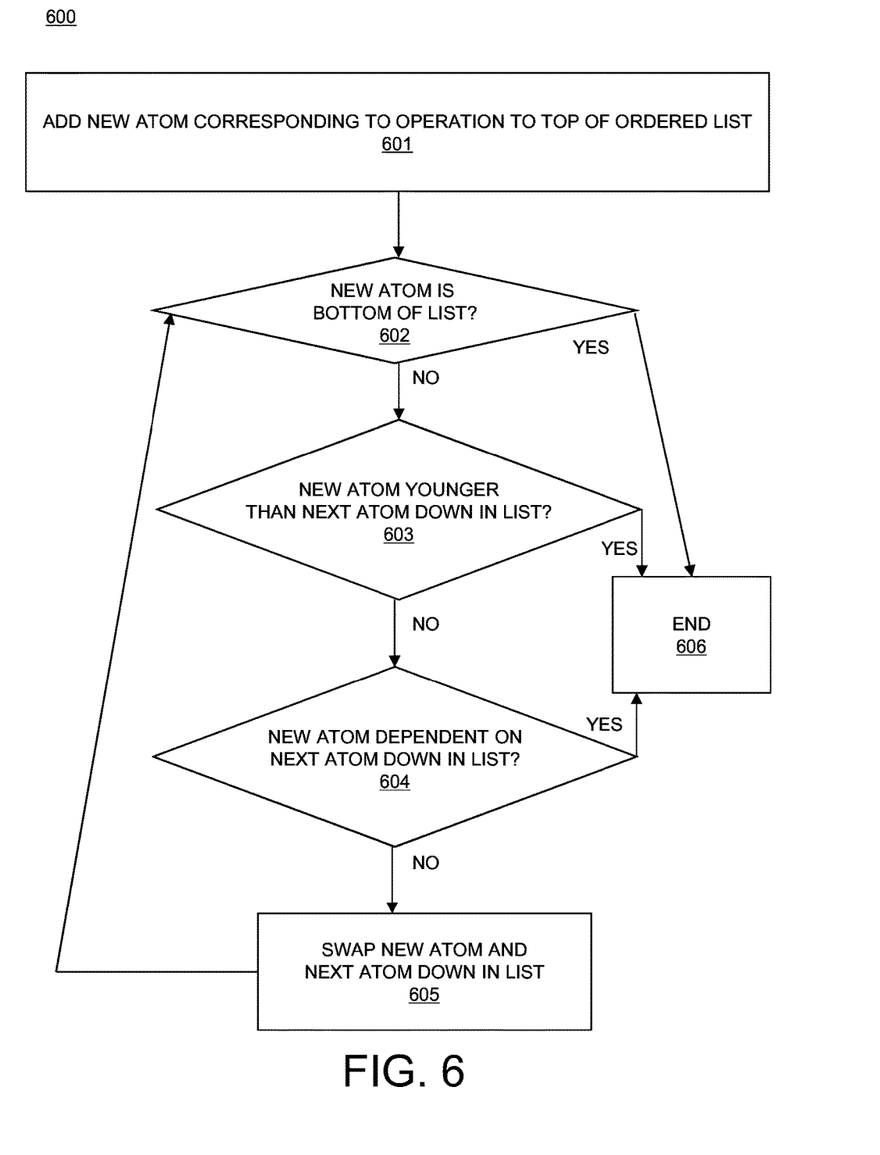
FIG. 6 depicts a process flow for top insertion in an ordered list in accordance with an embodiment.

FIG. 6 illustrates an embodiment of a method 600 for top insertion of an atom into an ordered list 300 such as is performed in block 501 of FIG. 5. In block 601, a new atom, such as atom 301A, corresponding to an operation that was finished by the thread corresponding to an ordered list 300, is inserted at the top 302 of the ordered list 300. Next, in block 602, it is determined whether the new atom is the bottom 303 of the ordered list 300. If it is determined in block 602 that the new atom is the bottom 303 of the list, flow proceeds to from block 602 to block 606, and method 600 ends. Otherwise, flow proceeds from block 602 to block 603, in which it is determined whether the program order of the new atom 301A indicates that new atom 301A is younger than the next atom down in the ordered list 300, i.e., atom 301B. If it is determined in block 603 that the new atom is older than the next atom down in the ordered list 300 based on the program order that is stored in each of the atoms, flow proceeds to block 604, in which it is determined if the new atom is dependent on (i.e., must be completed after) the next atom down in the ordered list 300. An atom may be dependent on another atom if, for example, the two atoms are directed to the same addresses in the cache 103. If it is determined in block 604 that the new atom is not dependent on the next atom down in the ordered list 300, flow proceeds to block 605, and the new atom and the next atom down in the ordered list 300 swap places (i.e., the new atom becomes atom 301B, and the next atom down becomes atom 301A at the top 302 of the ordered list 300). Flow then proceeds from block 605 back to block 602, and it is determined whether the new atom 301B is the bottom 303 of the ordered list 300. Blocks 602, 603, 604, and 605 are repeated until the new atom has moved down the ordered list 300 to its correct position in the ordered list 300 based on its program order and any dependencies. If, in block 602, it is determined that the new atom is the bottom of the list; or of, in block 603, it is determined that the new atom is younger than the next atom down in the ordered list 300; or if, in block 604, it is determined that the new atom is dependent on the next atom down in the ordered list 300, the new atom stays in its current position in the list, flow proceeds to block 606, and method 600 ends.

Figure 7:
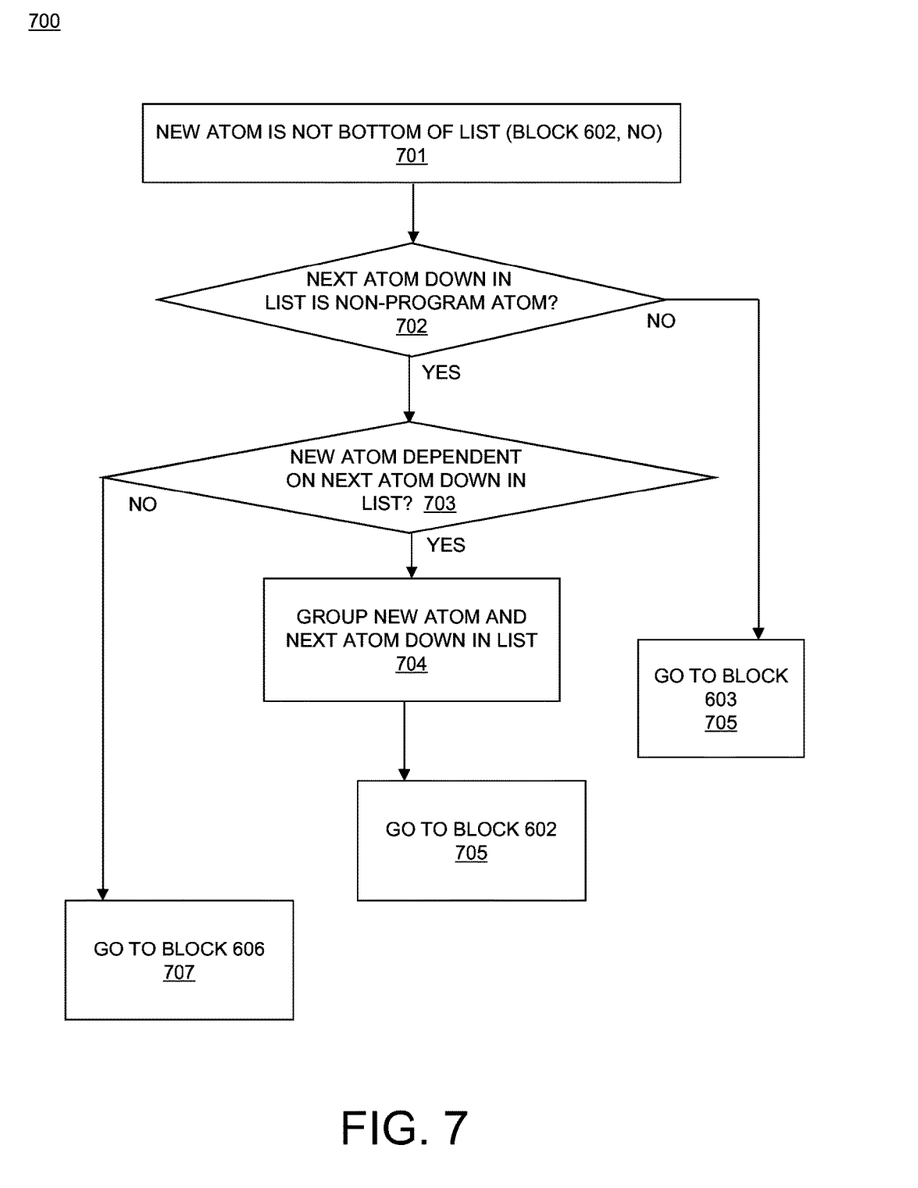
FIG. 7 depicts a process flow for top insertion with pushing of non-program atoms in an ordered list in accordance with an embodiment.

FIG. 7 depicts method 700 for top insertion with pushing of non-program atoms in an ordered list in accordance with an embodiment. A non-program atom comprises an atom that does not have a program order, and may be but is not limited to a snoop or an invalidate. Because a non-program atom does not have a program order, it cannot be evaluated in block 603 of FIG. 6 whether a non-program atom in the ordered list 300 is older than the new atom. However, a new atom may be dependent on (i.e., must complete after) a non-program atom that is already in the ordered list 300. Non-program atoms that a new atom is dependent on may be grouped with the new atom and pushed down the ordered list 300 ahead of the new atom. Therefore, in some embodiments of method 600 of FIG. 6, when it is determined in block 602 that the new atom (and any grouped non-program atoms, as discussed below) is not the bottom of the list, flow may proceed from block 602 to block 701 of FIG. 7. In block 701 of FIG. 7, the new atom is not the bottom of the ordered list 300, and flow proceeds from block 701 to block 702, in which it is determined whether the next atom down in the ordered list is a non-program atom that does not have a program order, e.g., a snoop or an invalidate. If it is determined in block 702 that the next atom down in the order list 300 is not a non-program atom, flow proceeds to block 705, in which flow returns to block 603 of FIG. 6, and method 700 ends. If it is determined in block 702 that the next atom down in the ordered list is a non-program atom, flow proceeds to block 703, in which is it is determined whether the new atom is dependent on the non-program next atom down in the ordered list 300. If it is determined in block 703 that the new atom is not dependent on the next atom down in the ordered list 300, flow proceeds to block 707, in which the new atom (and any grouped non-program atoms, as discussed below) and the next atom down in the ordered list are swapped (block 606 of FIG. 6). If it is determined in block 703 that the new atom is dependent on the next atom down in the ordered list, flow proceeds from block 703 to block 704, in which the new atom is grouped with the next atom down in the list. From block 704, flow proceeds to block 706, in which flow returns to block 602 of FIG. 6. The grouped non-program atom stays below the new atom, and is pushed ahead of the new atom down the list until the new atom reaches its correct location in the ordered list 300 as determined by method 600 of FIG. 6. Multiple non-program atoms may be grouped with a new atom in subsequent iterations of block 704. In subsequent iterations of FIG. 6 that incorporate method 700 of FIG. 7, the new atom is compared, in blocks 603 and 604, to a next atom down in the ordered list that is located below any non-program atoms that have been grouped with the new atom, and the new atom and the non-program atoms that have been grouped with the new atom are swapped as a single unit with the next atom down in the ordered list that is located below any non-program atoms that have been grouped with the new atom in block 605. Further, any non-program atoms that are grouped with the new atom are ignored in the determination of block 602 of FIG. 6.

Figure 8:
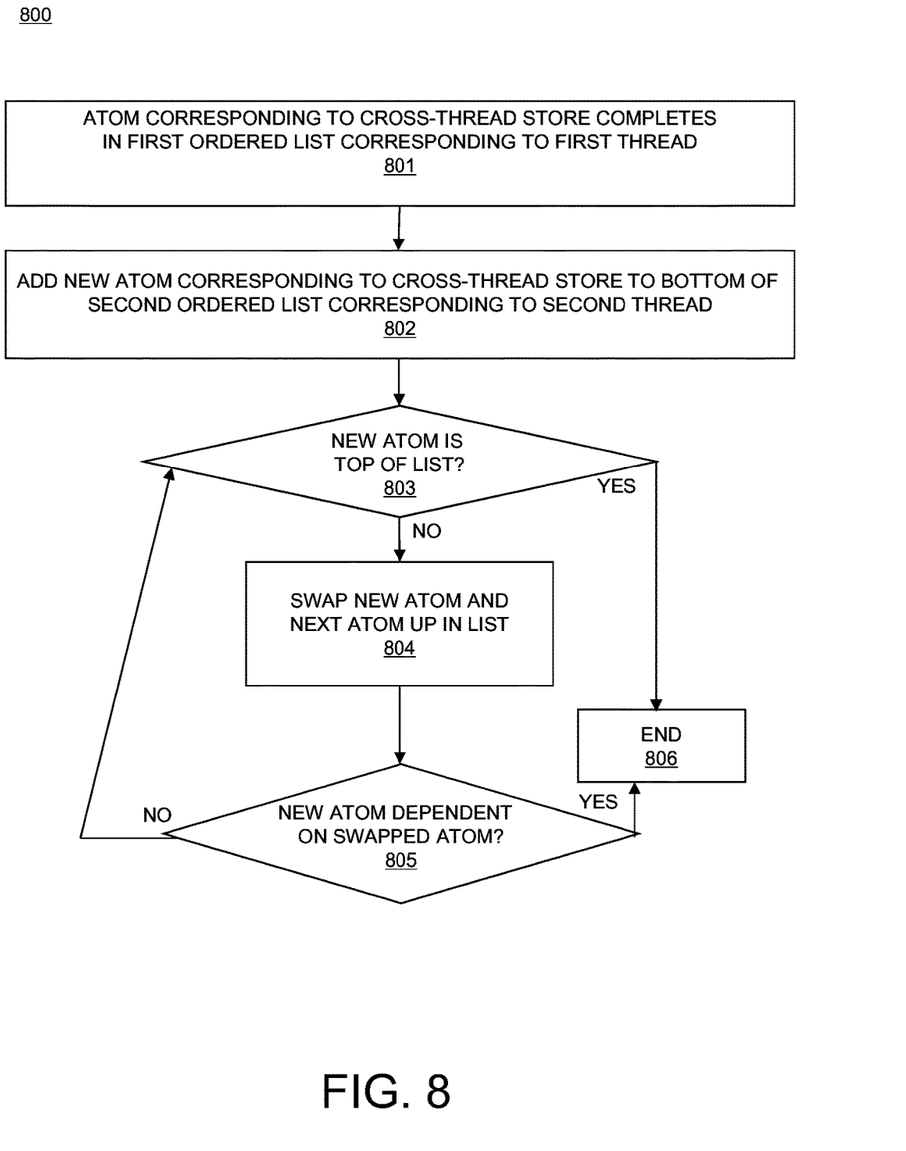
FIG. 8 depicts a process flow for bottom insertion in an ordered list in accordance with an embodiment.

FIG. 8 illustrates an embodiment of a method 800 for bottom insertion of an atom into an ordered list 300 such as is performed in block 505 of FIG. 5. In block 801, a cross-thread store is completed in a first ordered list 201A corresponding to a first thread. Next, in block 802, a new atom (for example, atom 301N) corresponding to the cross-thread store is added to the bottom 303 of a second ordered list 201B/300 corresponding to a second thread. Next, in block 803, it is determined whether the new atom is the top 302 of the second ordered list 201B/300. If it is determined in block 803 that the new atom is the top 302 of the second ordered list 201B/300, flow proceeds to from block 803 to block 806, and method 800 ends. Otherwise, flow proceeds from block 803 to block 804, in which the new atom and the next atom up in the second ordered list 201B/300 swap places (i.e., the new atom becomes atom 301M, and the next atom down becomes atom 301N at the bottom 303 of the ordered list 300). Flow then proceeds from block 804 to block 805, in which it is determined whether the new atom is dependent on (i.e., must be completed after) the atom with which the new atom was swapped in block 804 (the atom that is now directly below the new atom 301M, e.g., atom 301N) in the second ordered list 201B/300. An atom may be dependent on another atom if, for example, the two atoms are directed to the same addresses in the cache 103. If it is determined in block 805 that the new atom is dependent on the next atom down in the second ordered list 201B/300 in block 805, flow proceeds to block 806, and method 800 ends. If it is determined in block 805 that the new atom is not dependent on the next atom down in the second ordered list 201B/300 in block 805, flow proceeds from block 805 back to block 803, and it is determined whether the new atom 301M is the top 302 of the second ordered list 201B/300. Blocks 803, 804, and 805 are repeated until the new atom has moved up the second ordered list 201B/300 to its correct position in the second ordered list 201B/300 based any dependencies that the new atom may have. When, in block 803, it is determined that the new atom is the top of the ordered list 300, or if, in block 805, it is determined that the new atom is not dependent on the next atom down in the second ordered list 201B/300, the new atom stays in its current position in the second ordered list 201B/300, flow proceeds to block 806, and method 800 ends.

Figure 9:
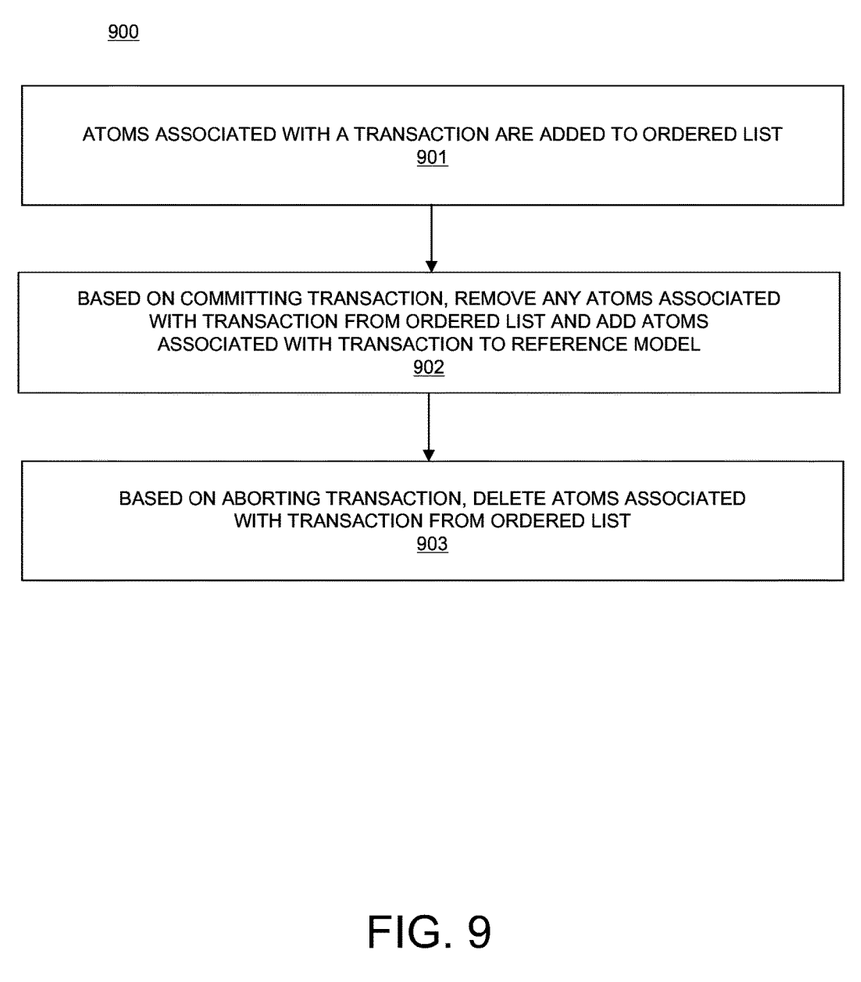
FIG. 9 depicts a process flow for transactions in an ordered list in accordance with an embodiment.

FIG. 9 depicts a method 900 for transactions in an ordered list in accordance with an embodiment. A transaction comprises a group of sequential operations that are conditionally performed, and that may be committed (i.e., completed) together based on all operations of the transaction being performed successfully, or aborted (i.e., rolled back) based on failure of any of the operations of the transaction. Atoms corresponding to operations in a transaction may enter an ordered list 300 and move to the bottom of the ordered list 300, where the atoms corresponding to the transaction may wait until the transaction is committed or aborted, at which point all atoms corresponding to the transaction may be either retired and removed, or deleted. Evaluation of atoms, as is performed in block 502 of FIG. 5, corresponding to a transaction may be used to determine any errors in transaction processing. In block 901 of FIG. 9, atoms associated with a transaction are added to the ordered list 300 using, for example, top insertion as discussed with respect to FIGS. 6 and 7, and/or bottom insertion as discussed with respect to FIG. 8. Each atom corresponding to a transaction may include an identifier of the particular transaction. These atoms move through the ordered list 300 as the application associated with the transaction executes. In block 902, the transaction is committed, and all of the atoms associated with the transaction are removed from the ordered list 300 together. The removed atoms associated with the committed transaction are added to the reference model 202. In block 903 of FIG. 9, there is a failure in the transaction, the transaction is aborted, and all of the atoms associated with the aborted transaction are deleted from the ordered list 300 together. These deleted atoms are not added to the reference model 202.

Technical effects and benefits include modeling and verification of cache coherency with relatively low overhead.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing cache coherency verification using ordered lists, the computer program product comprising:
   a non-transitory computer readable storage medium having program instructions embodied therewith, the program instructions readable by a processing circuit to cause the processing circuit to perform a method comprising:
   maintaining, by a cache coherency verification module, a plurality of ordered lists, each ordered list corresponding to a respective thread that is executed by a processor, wherein each ordered list comprises a plurality of atoms, each atom corresponding to a respective operation performed in a cache by the respective thread that corresponds to the ordered list in which the atom is located, wherein the plurality of atoms in an ordered list are ordered based on program order;
   determining a state of an atom in an ordered list of the plurality of ordered lists;
   comparing the state of the atom in an ordered list to a state of an operation corresponding to the atom in the cache;
   based on the comparing, determining that there is a coherency violation in the cache,
   wherein the processor comprises a simultaneous multi-threaded (SMT) processor, and further comprising:
   based on an atom corresponding to a store completing in a first ordered list of the plurality of ordered lists, inserting a new atom corresponding to the store into a second ordered list of the plurality of ordered lists via bottom insertion, wherein bottom insertion comprises:
   placing the new atom at the bottom of the second ordered list;
   swapping the new atom and a next atom up in the second ordered list;
   determining whether the new atom is dependent on the swapped atom;
   based on determining that the new atom is dependent on the swapped atom, determining that the bottom insertion is completed; and
   based on determining that the new atom is not dependent on the swapped atom, swapping the new atom and a next atom that is located directly above the new atom in the second ordered list.

2. The computer program product of claim 1, wherein maintaining an ordered list of the plurality of ordered lists comprises:
   based on finishing of an operation by the processor, inserting a new atom corresponding to the operation into the ordered list via top insertion, wherein top insertion comprises:
   placing the new atom at the top of the ordered list;
   comparing a program order of the new atom to a program order of a next atom down in the ordered list;
   based on the comparing of the program orders indicating that the new atom is older than the next atom down in the ordered list, determining whether the new atom is dependent on the next atom down in the ordered list;

based on determining that the new atom is not dependent on the next atom down in the ordered list, swapping the new atom and the next atom down in the ordered list;

based on determining that the new atom is dependent on the next atom down in the ordered list, not swapping the new atom and the next atom down in the ordered list; and based on swapping the new atom and the next atom down in the ordered list, comparing the program order of the new atom to a program order of a next atom that is located directly below the new atom after the swapping.

3. The computer program product of claim 1, wherein the state of the atom comprises at least one of data and a dependency associated with the atom.

4. The computer program product of claim 1, wherein the operation comprises one of a load, a store, a snoop, and an invalidate.

5. The computer program product of claim 1, wherein the determining the state of the atom and comparing the state of the atom to the state of the operation corresponding to the atom in the cache is performed based on the operation corresponding to the atom being completed by the processor.

6. The computer program product of claim 1, further comprising:
   determining that an operation has been retired by the processor; and
   removing an atom corresponding to the retired operation from the ordered list and inserting the removed atom into a reference model, the reference model comprising a model of a state of the cache.

7. The computer program product of claim 1, further comprising:
   determining that an operation has been unwound by the processor; and
   deleting an atom corresponding to the unwound operation from the ordered list.

8. The computer program product of claim 1, wherein a plurality of atoms in the ordered list correspond to a transaction, and further comprising:
   based on committing the transaction, removing the plurality of atoms corresponding to the transaction from the ordered list and inserting the removed plurality of atom into a reference model, the reference model comprising a model of a state of the cache; and
   based on aborting the transaction, deleting the plurality of atoms corresponding to the transaction from the ordered list, wherein the deleted plurality of atoms are not inserted into the reference model.

9. A computer system for implementing cache coherency verification using ordered lists, the computer system comprising:
   a processor;
   a cache; and
   a cache coherency verification module, the computer system configured to perform a method comprising:
   maintaining, by the cache coherency verification module, a plurality of ordered lists, each ordered list corresponding to a respective thread that is executed by the processor, wherein each ordered list comprises a plurality of atoms, each atom corresponding to a respective operation performed in the cache by the respective thread that corresponds to the ordered list in which the atom is located, wherein the plurality of atoms in an ordered list are ordered based on program order;
   determining a state of an atom in an ordered list of the plurality of ordered lists;
   comparing the state of the atom in an ordered list to a state of an operation corresponding to the atom in the cache;
   based on the comparing, determining that there is a coherency violation in the cache,
   based on an atom corresponding to a store completing in a first ordered list of the plurality of ordered lists, inserting a new atom corresponding to the store into a second ordered list of the plurality of ordered lists via bottom insertion, wherein bottom insertion comprises:
   placing the new atom at the bottom of the second ordered list;
   swapping the new atom and a next atom up in the second ordered list;
   determining whether the new atom is dependent on the swapped atom;
   based on determining that the new atom is dependent on the swapped atom, determining that the bottom insertion is completed; and
   based on determining that the new atom is not dependent on the swapped atom, swapping the new atom and a next atom that is located directly above the new atom in the second ordered list.

10. The computer system of claim 9, wherein maintaining an ordered list of the plurality of ordered lists comprises:
    based on finishing of an operation by the processor, inserting a new atom corresponding to the operation into the ordered list via top insertion, wherein top insertion comprises:
    placing the new atom at the top of the ordered list;
    comparing a program order of the new atom to a program order of a next atom down in the ordered list;
    based on the comparing of the program orders indicating that the new atom is older than the next atom down in the ordered list, determining whether the new atom is dependent on the next atom down in the ordered list;
    based on determining that the new atom is not dependent on the next atom down in the ordered list, swapping the new atom and the next atom down in the ordered list;
    based on determining that the new atom is dependent on the next atom down in the ordered list, not swapping the new atom and the next atom down in the ordered list; and
    based on swapping the new atom and the next atom down in the ordered list, comparing the program order of the new atom to a program order of a next atom that is located directly below the new atom after the swapping.

11. The computer system of claim 9, wherein the state of the atom comprises at least one of data and a dependency associated with the atom.

12. The computer system of claim 9, wherein the determining the state of the atom and comparing the state of the atom to the state of the operation corresponding to the atom in the cache is performed based on the operation corresponding to the atom being completed by the processor.

13. The computer system of claim 9, further comprising:
    determining that an operation has been retired by the processor; and
    removing an atom corresponding to the retired operation from the ordered list and inserting the removed atom into a reference model, the reference model comprising a model of a state of the cache.

14. The computer system of claim 9, further comprising:
determining that an operation has been unwound by the processor; and
deleting an atom corresponding to the unwound operation from the ordered list.

\* \* \* \* \*